United States Patent [19]

Nakamura

[11] Patent Number: 5,675,083
[45] Date of Patent: Oct. 7, 1997

[54] VIBRATING GYROSCOPE HAVING DIVIDED DETECTION ELEMENTS

[75] Inventor: Takeshi Nakamura, Uji, Japan

[73] Assignee: Murata Manufacturing Co., Ltd., Japan

[21] Appl. No.: 571,067

[22] Filed: Dec. 12, 1995

[30] Foreign Application Priority Data

| Dec. 15, 1994 | [JP] | Japan | 6-333978 |
| Dec. 26, 1994 | [JP] | Japan | 6-338039 |
| Mar. 31, 1995 | [JP] | Japan | 7-100279 |

[51] Int. Cl.⁶ .................................. G01P 9/04
[52] U.S. Cl. .................... 73/504.12; 73/504.14; 310/316
[58] Field of Search ............. 73/504.04, 504.12, 73/504.13, 504.14, 504.15; 310/316, 317

[56] References Cited

U.S. PATENT DOCUMENTS

| 3,520,195 | 7/1970 | Tehon ............................. 73/504.14 |
| 4,431,935 | 2/1984 | Rider . |
| 4,799,385 | 1/1989 | Hulsing et al. . |
| 5,012,174 | 4/1991 | Adkins et al. . |
| 5,117,148 | 5/1992 | Nakamura et al. ............... 310/367 |
| 5,256,929 | 10/1993 | Terajima . |
| 5,270,607 | 12/1993 | Terajima ........................... 310/316 |
| 5,349,857 | 9/1994 | Kasanami et al. ............... 73/504.12 |
| 5,355,034 | 10/1994 | Nakamura et al. ............... 307/491 |
| 5,400,269 | 3/1995 | White et al. . |
| 5,412,204 | 5/1995 | Nakamura et al. . |
| 5,415,039 | 5/1995 | Nakamura ....................... 73/514.34 |
| 5,430,342 | 7/1995 | Watson ............................ 310/316 |
| 5,434,467 | 7/1995 | Abe et al. ........................ 310/316 |

FOREIGN PATENT DOCUMENTS

| 0520467A2 | 6/1992 | European Pat. Off. . |
| 0520468A2 | 6/1992 | European Pat. Off. . |
| 0520467A3 | 6/1992 | European Pat. Off. . |
| 0579974 | 6/1993 | European Pat. Off. . |
| 0597338 | 10/1993 | European Pat. Off. . |
| 6416911 | 1/1989 | Japan . |
| 6-18266 | 1/1994 | Japan ................. 73/504.12 |
| 6-50761 | 2/1994 | Japan ................. 73/504.12 |
| 6-147899 | 5/1994 | Japan ................. 73/504.14 |

OTHER PUBLICATIONS

"Patent Abstracts of Japan" vol. 13 No. 191 (p. 867), Sep. 5, 1989.

*Primary Examiner*—Hezron E. Williams
*Assistant Examiner*—Helen C. Kwok
*Attorney, Agent, or Firm*—Ostrolenk, Faber, Gerb & Soffen, LLP

[57] ABSTRACT

A vibrating gyroscope 10 which can suppress a drift signal even if the resonance characteristics of a plurality of detection means of the vibrating body vary includes a vibrator 12. The vibrator 12 comprises a columnar, triangular shaped vibrating body 14 and piezoelectric elements 16, 18, and 20. Divided sections 16a and 16b of the detection piezoelectric element 16 are connected to a first cumulative circuit 32 and a first differential circuit 34. Divided sections 18a and 18b of the detection piezoelectric element 18 are connected to a second cumulative circuit 36 and a second differential circuit 38. Output signals of the first and second cumulative circuits 32 and 36 are input into a third differential circuit 40. Output signals of the first and second differential circuits 34 and 38 are input into a fourth differential circuit 42. Output signals of the third and fourth differential circuits 40 and 42 are input into an arithmetic circuit 44. Alternatively, it may be allowed that the divided sections 16a and 18a, as well as 16b and 18b of the piezoelectric elements 16 and 18 are connected separate differential circuits, and output signals of these differential circuits are input into the arithmetic circuit.

26 Claims, 8 Drawing Sheets

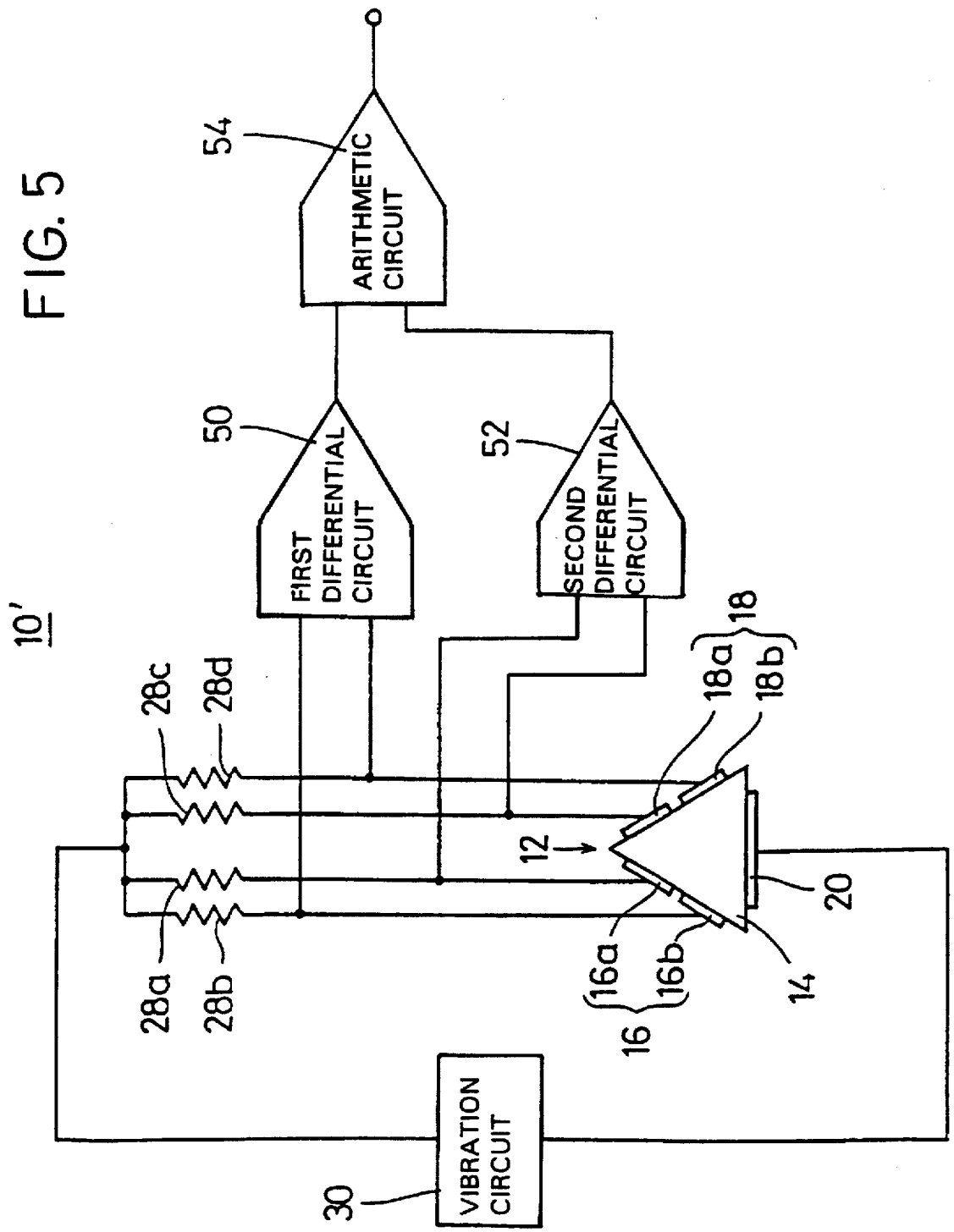

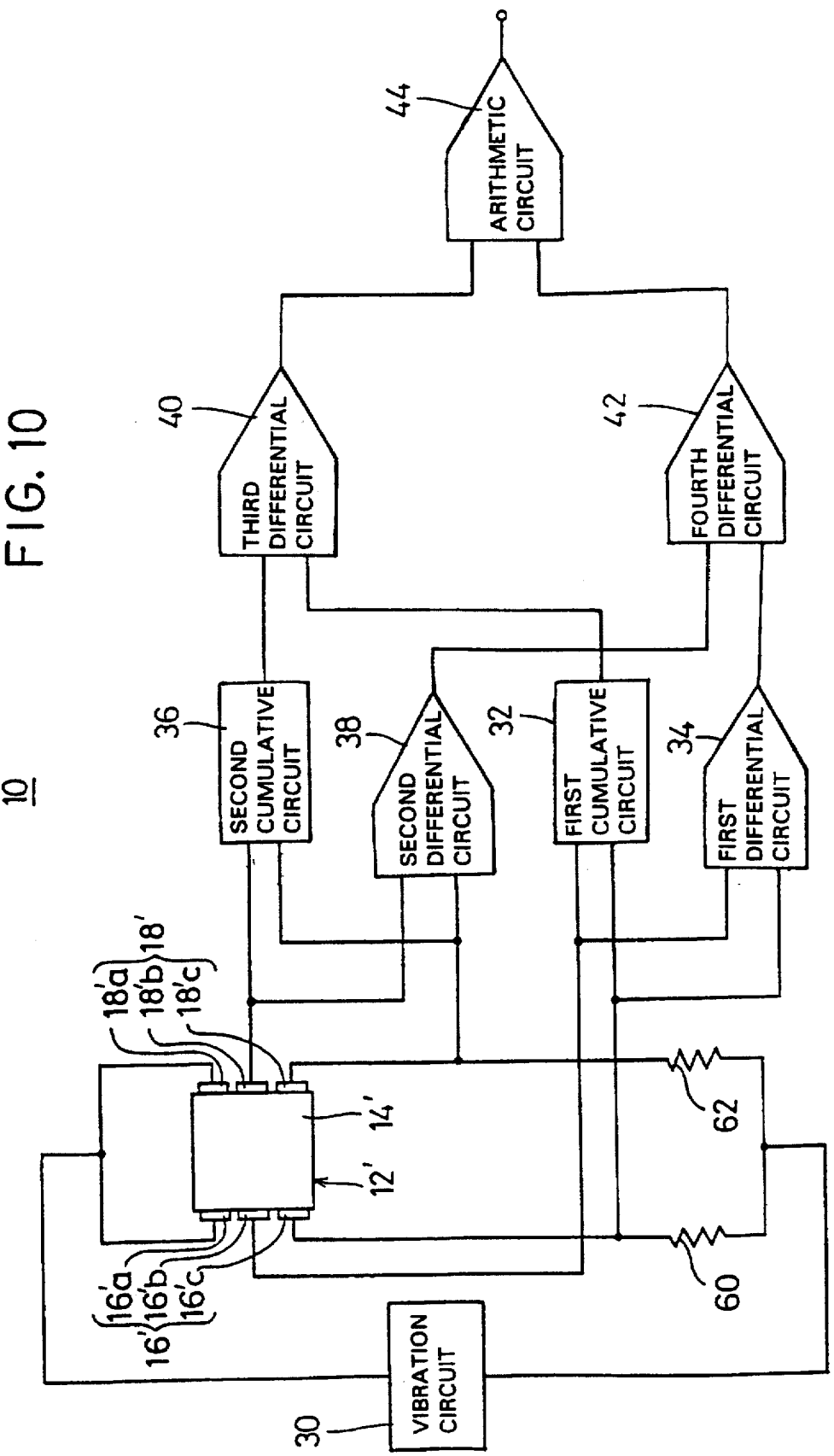

VIBRATING GYROSCOPE HAVING DIVIDED DETECTION ELEMENTS

BACKGROUND OF THE INVENTION

1. Field of the Invention

The present invention relates to a vibrating gyroscope, and, more particularly, to a vibrating gyroscope for detecting a rotation angular velocity by utilizing vibration of a vibrator.

2. Description of the Prior Art

FIG. 12 is an illustration of an example of conventional vibrating gyroscopes. A vibrating gyroscope 1 comprises a vibrating body 2 in a form of a columnar, triangular body. Formed on three sides of the vibrating body 2 are piezoelectric elements 3a, 3b, and 3c to which resistors 4a and 4b are connected. A vibration circuit 5 is connected between the resistors 4a, 4b and the piezoelectric element 3c. The vibration circuit 5 includes, for example, an amplifier circuit, a phase circuit, and an vibration control circuit such as an AGC circuit. The output signal of the vibration circuit 5 is supplied to the piezoelectric elements 3a and 3b, while the output signal of the piezoelectric element 3c is fed back to the vibration circuit 5. Thus, the vibrating body 2 is self vibrated so that the vibrating body 2 bends and vibrates in a direction orthogonal to a plane in which the piezoelectric element 3c is provided.

The piezoelectric elements 3a and 3b are connected to the input terminal of a differential circuit 6. In the case where no rotation angular velocity acts on the vibrating gyroscope 1, the same drive signals are input to the piezoelectric elements 3a and 3b. Thus, the differential circuit 6 outputs no signal. When rotational angular velocity acts on the vibrating gyroscope 1, then the bending vibration direction of the vibrating body 2 is varied by the Coriolis force. This causes a difference between signals generated in the piezoelectric elements 3a and 3b, and the differential circuit 6 outputs the difference between the signals. Since the variations in the bending vibration of the vibrating body 2 are proportional to the Coriolis force, the output signal from the differential circuit 6 also corresponds to the Coriolis force. Thus, direct current output corresponding to the rotation angular velocity can be obtained by synchronous detecting and smoothing the output signal of the differential circuit 6.

However, if there arises a difference of vibration characteristics of two detection means by change of atmospheric temperature or warpage of the vibrating body, difference is caused in signals generated by the detecting piezoelectric elements even at no rotation so that a drift signal is output from the differential circuit. Thus, even no rotation state may be erroneously determined as if rotation angular velocity acts.

SUMMARY OF THE INVENTION

Therefore, the main object of the present invention is to provide a vibrating gyroscope which can suppress a drift signal even if the resonance characteristics of a plurality of detection means of the vibrating body vary.

These and other objects of the invention may be achieved by a vibrating gyroscope which includes a vibrating body for vibration; a plurality of detection means respectively provided at spaced locations of said vibrating body and divided into several sections; and means for interconnecting the sections of said detection means such that any drift signal is suppressed.

The present invention in accordance with one aspect is a vibrating gyroscope comprising a columnar vibrating body for vibration, a plurality of detection means respectively provided on the side of the vibrating body and divided into several sections, a first cumulative circuit to an input terminal of which two of the divided sections of one of the detection means are connected, a first differential circuit to an input terminal of which two of the divided sections of one of the detection means are connected, a second cumulative circuit to an input terminal of which two of the divided sections of another one of the detection means are connected, a second differential circuit to an input terminal which two of the divided sections of another one of the detection means are connected, a third differential circuit to an input terminal of which the first and second cumulative circuits are connected, a fourth differential circuit to an input terminal of which the first and second differential circuits are connected, and an arithmetic circuit to an input terminal of which the third and fourth differential circuits are connected.

The present invention in accordance with another aspect is also a vibrating gyroscope comprising a columnar vibrating body for vibration, a plurality of detection means respectively provided on a side of the vibrating body and divided into several sections, a first differential circuit to an input terminal of which one of the divided sections of the respective detection means is connected, a second differential circuit to an input terminal of which another one of the divided sections of the respective detection means is connected, and an arithmetic circuit to an input terminal of which the first and second differential circuits are connected.

In these vibrating gyroscopes, the plurality of detection means are arranged to be symmetrical relative to the oscillating direction of the vibrating body at no rotation.

Desirably, one of the divided sections of the respective detection means is formed on the center line of vibration of the vibrating body without rotation.

Particularly, when the columnar vibrating body is formed with a triangular shape, piezoelectric elements as the plurality of detection means are formed on two sides of the vibrating body, each piezoelectric element being divided into two along the center axis of the vibrating body.

In addition, when the columnar vibrating body is formed with a square shape, piezoelectric elements as the plurality of detection means are formed on two opposite sides, each piezoelectric element being equally divided into three along the center axis of the vibrating body.

As each detection means is divided, bending states of the divided sections of the one detection mean are different from each other with respect to vibration of the vibrating body at no rotation. Consequently, a differential circuit to which the divided sections of the detection means are connected outputs a signal corresponding to the difference in bending state. However, since signals corresponding to the Coriolis force generated in the divided sections of the same detection mean are substantially equal, these signals can be canceled by the differential circuit and is not output. Thus, only signals corresponding to the resonance characteristics of the detection mean are output regardless of application of rotation angular velocity by adjusting the differential circuit. Accordingly, the fourth differential circuit outputs differences of resonance characteristics of a plurality of detection means as signals.

The cumulative circuit outputs the sum of signals generated in the detection means, which are divided. Therefore, the signal output from the cumulative circuit contains a signal corresponding to the Coriolis force and a signal corresponding to the resonance characteristics of the detection mean. Thus, the third differential circuit outputs the difference between the output signals from a plurality of detection means, which signals contain a signal corresponding to the Coriolis force and a signal corresponding to the resonance characteristics. Accordingly, the arithmetic circuit outputs a signal without a signal corresponding to the resonance characteristics. In other words, the output signal obtained from the arithmetic circuit is only a signal corresponding to the Coriolis force.

When the resonance characteristics of one detection mean changes, the signals corresponding to this changing resonance characteristic and varying changes in the same ratio are output from respective divided section of the detection mean. Therefore, when one divided section of each detection means is connected to the first differential circuit, and another divided section is connected to the second differential circuit, the signal corresponding to the resonance characteristics contained in the output signal of the first differential circuit and the signal corresponding to the resonance characteristics contained in the output signal of the second differential circuit vary in the same ratio. Thus, if the arithmetic circuit is adjusted not to output a signal corresponding to the resonance characteristics, even when a difference is caused in the resonance characteristics of a plurality of detection means due to changes of atmospheric temperature or the like, the arithmetic circuit can be arranged never to output a signal corresponding to the resonance characteristics. Accordingly, the arithmetic circuit can be arranged only to output a signal corresponding to the Coriolis force.

According to the present invention, because only the signal corresponding the Coriolis force can be obtained, the rotation angular velocity can be accurately detected even if the resonance characteristics vary in each direction of the vibrating body.

The above and other objects, features and advantages of the present invention will become clearer from the detailed description of embodiment thereof referring to the attached drawings.

BRIEF DESCRIPTION OF THE DRAWING(S)

FIG. 5 is a block diagram illustrating another embodiment of the present invention.

FIG. 10 is a block diagram showing an example of vibrating gyroscope using the vibrator shown in FIG. 8.

DETAILED DESCRIPTION OF EMBODIMENTS OF THE INVENTION

Figure 1:
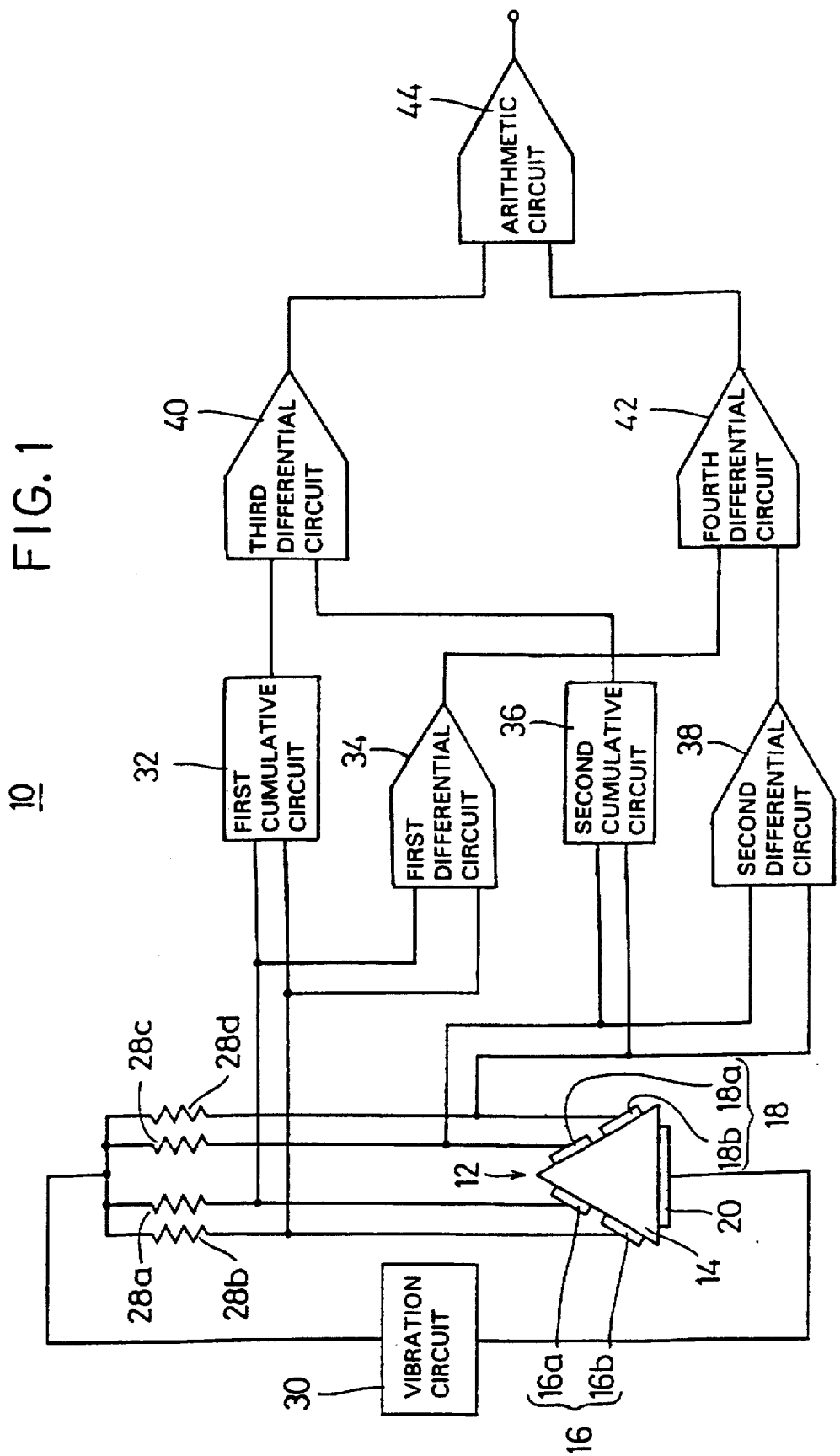
FIG. 1 is a block diagram illustrating an embodiment of the present invention.
Figure 2:
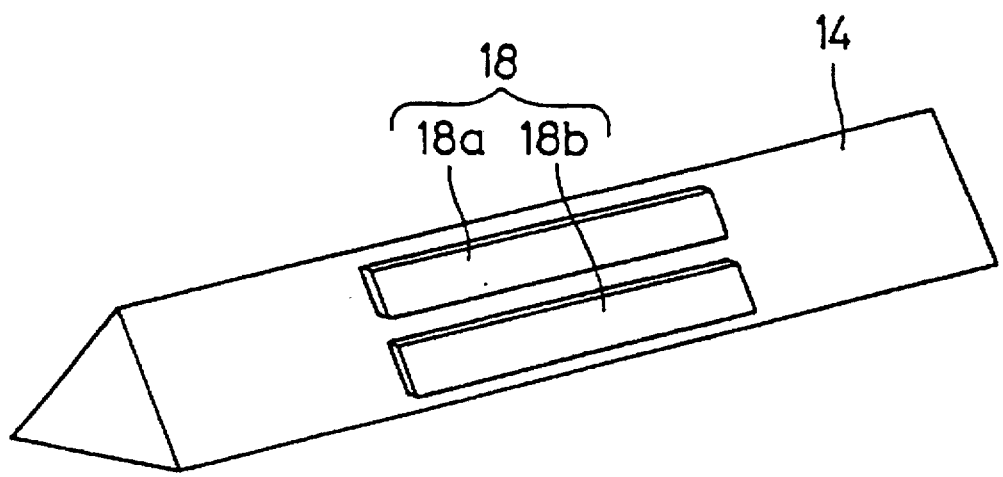
FIG. 2 is a perspective view showing an vibrator of the vibrating gyroscope shown in FIG. 1.
Figure 3:
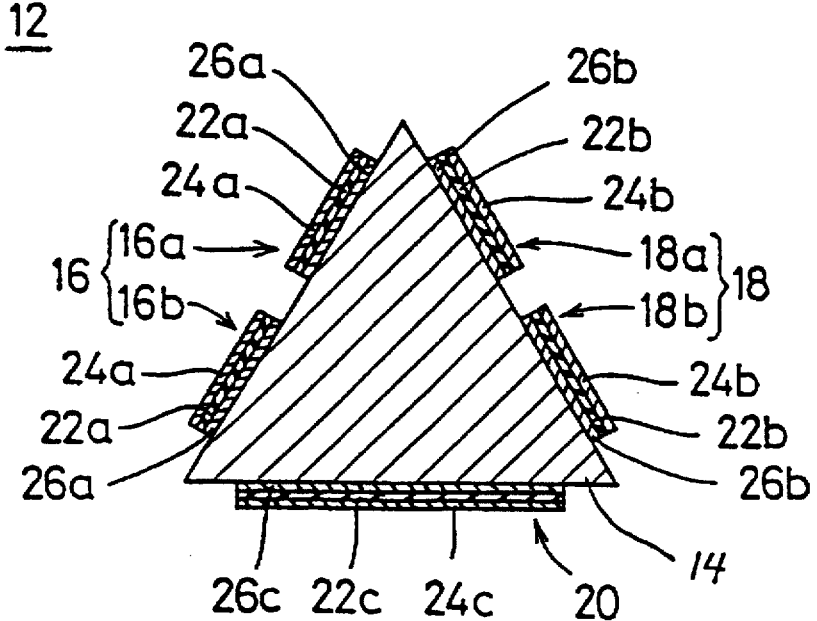
FIG. 3 is a sectional view of the vibrator shown in FIG. 2.

Referring now to the drawings and, in particular, to FIGS. 1–3, a vibrating gyroscope 10 in accordance with this invention comprises a vibrator 12. The vibrator 12 comprises a vibrating body 14 in the form of, for example, a columnar, triangular body as shown in FIGS. 2 and 3. The vibrating body 14 is formed by a material generally generating mechanical vibration such as Elinvar, iron-nickel alloy, quartz, glass, crystal, or ceramics.

Piezoelectric elements 16, 18, and 20 are formed at substantially the center of each of three sides of the vibrating body 14. The piezoelectric element 16 is equally divided in two along the center axis of the vibrating body 14. Consequently, the piezoelectric element 16 has two divided sections 16a and 16b in the lateral direction of the side of the vibrating body 14. Similarly, the piezoelectric element 18 is equally divided in two along the center axis of the vibrating body 14. Consequently, the piezoelectric element 18 has two divided sections 18a and 18b in the lateral direction of the side of the vibrating body 14. However, the piezoelectric element 20 is not divided.

The piezoelectric element 16 comprises a piezoelectric layer 22a comprises of, for example, piezoelectric ceramics. Electrodes 24a and 26a are formed on both surfaces of the piezoelectric layer 22a. One of the electrodes 26a is bonded to the vibrating body 14. Similarly, the piezoelectric elements 18 and 20 comprise piezoelectric layers 22b and 22c. Electrodes 24b and 26b, as well as 24c and 26c are formed on both surfaces of the piezoelectric layers 22b and 22c, respectively. Then, respective one of the electrodes 26b and 26c of the piezoelectric element 18 and 20 are bonded to the vibrating body 14. In this embodiment, the piezoelectric elements 16 and 18 are used for feedback when the vibrating body 14 is caused to bend, and also used for detection for obtaining a signal corresponding to the rotation angular velocity. In addition, the piezoelectric element 20 is used for driving when the vibrating body 14 is caused to bend.

As seen in FIG. 1, the divided sections 16a and 16b of the piezoelectric element 16, and the divided sections 18a and 18b of the piezoelectric element 18 are connected to resistors 28a, 28b, 28c and 28d, respectively. A vibration circuit 30 is connected between the resistors 28a–28d and the piezoelectric element 20. The vibration circuit 30 comprises, for example, an amplifier circuit, a phase circuit, and an vibration control circuit such as an AGC circuit. The output signals of the piezoelectric elements 16 and 18 are fed back to the amplifier circuit, and input into the piezoelectric element 20 after phase correction by the phase circuit. The vibration circuit 30 drives the vibrator 12 to cause self vibration. Thus, the vibrating body 14 is bent and vibrated in a direction orthogonal to the plane which the piezoelectric element 20 is provided.

The divided sections 16a and 16b of the piezoelectric element 16 are connected to input terminals of a first cumulative circuit 32 and a first differential circuit 34. In addition, the divided sections 18a and 18b of the piezoelectric element 18 are connected to the input terminals of a second cumulative circuit 36 and a second differential circuit 38. Output terminals of the first and second cumulative circuits 32 and 36 are connected to an input terminal of a third differential circuit 40. Moreover, output terminals of the first and second differential circuits 34 and 38 are connected to an input terminal of a fourth differential circuit 42. Then, output terminals of the third and fourth differential circuits 40 and 42 are connected to an input terminal of an arithmetic circuit 44.

Figure 4:
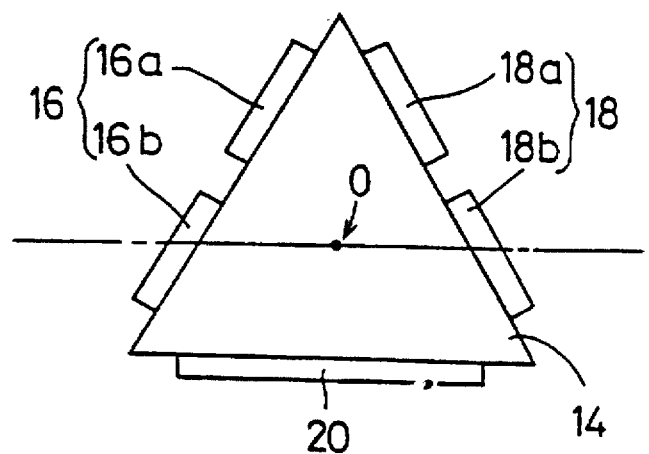
FIG. 4 is a block diagram illustrating the relationship between the vibration state of the vibrator and the bending state of piezoelectric elements shown in FIGS. 2 and 3.

When the vibrating gyroscope 10 is used, the vibrating body 14 is bent and vibrated in a direction orthogonal to the plane which the piezoelectric element 20 is provided by the vibration circuit 30. At that moment, as shown in FIG. 4, the vibrating body 14 vibrates in such a manner that its expansion and contraction are reversed in both sides of a dash-and-dot line passing its center O. That is, it is bent and vibrated in such a manner that, with the dash-and-dot line in FIG. 4 as a boundary, one side is contracted when the other side is expanded. The center of the vibrating body 14 is at about ⅓ of the entire height of the triangle as viewed from the piezoelectric element 20. Thus, the divided section 16a of the piezoelectric element 16 exhibits the same bending as a whole. However, since the divided section 16b straddles both sides of the dash-and-dot line, it exhibits opposite bending in each side. In other words, the divided section 16b of the piezoelectric element 16 contracts one side of the dash-and-dot line while it expands on the other side. Similarly, the divided section 18b of the piezoelectric element 18 also exhibits opposite bending on each side of the dash-and-dot line.

Because the entire divided section 16a of the piezoelectric element 16 exhibits the same bending while the vibrating body 14 is bent and vibrated, charges with the same polarity are generated. On the other hand, because the divided section 16b exhibits opposite bending on each side of the dash-and-dot line, charges with opposite polarities are generated. Accordingly, the divided section 16b outputs charges different than those outputted by the divided section 16a. Thus, a difference is caused between the output signals from the divided sections 16a and 16b so that the first differential circuit 34 outputs a signal. Similarly, a difference is caused between the output signals from the divided sections 18a and 18b of the piezoelectric element 18 so that the second differential circuit 38 outputs a signal.

As the vibrating body 14 rotates around its axis, the direction of bending vibration of the vibrating body 14 is changed by the Coriolis force. Since the Coriolis force acts in a direction orthogonal to the vibration at no rotation, the variation part of vibration caused by the Coriolis force is substantially the same for both the divided sections 16a and 16b of the piezoelectric element 16. That is, bending of the divided sections 16a and 16b caused by the Coriolis force is the same amount. Thus, charges generated in the divided sections 16a and 16b by the Coriolis force become substantially the same amount. The signal corresponding to the Coriolis force can be canceled by adjusting the first differential circuit 34 so that it is not output. Accordingly, the signal output from the first differential circuit 34 is only a signal corresponding to the resonance characteristics of one of the detection means of the vibrating body 14. Similarly, the signal output from the second differential circuit 38 is only a signal corresponding to the resonance characteristics of the other detection mean of the vibrating body 14.

In addition, the first cumulative circuit 32 outputs the sum of the output signals from the divided sections 16a and 16b of the piezoelectric element 16. The output signal contains a signal corresponding to the Coriolis force and a signal corresponding to the resonance characteristics of one of the detection means. Similarly, the second cumulative circuit 36 outputs the sum of the output signals from the divided sections and 18b of the piezoelectric element 18. The output signal contains a signal corresponding to the Coriolis force and a signal corresponding to the resonance characteristics of the other detection mean.

The third differential circuit 40 outputs the difference between the output signals from the first and second cumulative circuits 32 and 36. Thus, the output signal from the third differential circuit 40 contains signals corresponding to the Coriolis force obtained from two detection means. Since the piezoelectric elements 16 and 18 of these two detection means are disposed to be symmetrical with respect to the plane containing the vibration direction of the vibrating body 14 at no rotation, when the vibration direction of the vibrating body 14 is changed by the Coriolis force, charges generated from one piezoelectric element would have opposite polarity to charges generated from the other piezoelectric element. Accordingly, a large output corresponding to the Coriolis force can be obtained from the third differential circuit 40. The output signal from the third differential circuit 40 contains a signal corresponding to the difference between the resonance characteristics of one detection mean and those of the other detection mean.

Furthermore, the fourth differential circuit 42 outputs the difference between the output signals from the first and second differential circuits 34 and 38. Since the first and second differential circuits 34 and 38 output the output signals corresponding to the resonance characteristics of two detection means, the fourth differential circuit 42 provides a signal corresponding to the difference between the resonance characteristics of two detection means. Then, the output signal does not contain a signal corresponding to the Coriolis force. However, the output signal of the fourth differential circuit 42 differs from the signal corresponding to the difference of the resonance characteristics contained in the output signal of the third differential circuit 40. This is because the output signal of the third differential circuit 40 is derived from the cumulative circuits 32 and 36, while the output signal of the fourth differential circuit 42 is derived from the differential circuits 34 and 38. However, at no rotation, the charges generated from the respective divided sections 16b and 18b of the piezoelectric elements 16 and 18 are smaller than those generated from the respective divided sections 16a and 18a, while the output of the third differential circuit 40 is substantially equal to that of the fourth differential circuit 42. In addition, if the divided sections 16b and 18b are arranged to be positioned at the center of bending vibration, the charges generated at no rotation are self canceled to be zero, and the output from the third differential circuit 40 becomes equal to that from the fourth differential circuit 42.

The output signals of the third and fourth differential circuits 40 and 42 are input into the arithmetic circuit 44. Then, the difference of these signals is output from the arithmetic circuit 44. The arithmetic circuit 44 is adjusted so that the output signal of the fourth differential circuit 42 is equal to the signal corresponding to the resonance characteristics contained in the output signal of the third differential circuit 40. Consequently, the arithmetic circuit 44 outputs only a signal corresponding to the Coriolis force. The rotation angular velocity can be detected by synchronous detecting and smoothing the output signal of the arithmetic circuit 44.

In the vibrator 12, when the resonance characteristics are the same for two detection means in which the piezoelectric elements 16 and 18 exist, the output signal of the third differential circuit 40 does not contain the signal corresponding to the resonance characteristics. In addition, the fourth differential circuit 42 does not output any signal. Therefore, the signal output from the arithmetic circuit 44 contains only a signal component corresponding to the Coriolis signal. The resonance characteristics of two detection mean may be changed because of a change in atmospheric temperature or warpage of the vibrating body 14. Even in such a case, variation in the output signals of the divided sections 16a and 16b of the piezoelectric element 16 in one detection means is at the same ratio. In addition, variation in the output signals of the divided sections 18a and 18b of the piezoelectric element 18 in the other detection means is also at the same ratio. Accordingly, the signal corresponding to the resonance characteristics contained in the output of the third differential circuit 40 varies at the same ratio as the signal corresponding to the resonance characteristics contained in the output of the fourth differential circuit 42. Thus, it is possible to cause the arithmetic circuit 44 to always output only a signal corresponding to the Coriolis force.

As described, the vibrating gyroscope can provide only a signal corresponding to the Coriolis force even when the resonance characteristics of two detection means vary independently. Therefore, even if the atmospheric temperature changes, the rotation angular velocity can be accurately detected. The arithmetic circuit 44 is sufficiently adjusted by adjusting the offset (output at no rotation=0). It may be adjusted by placing the vibrating gyroscope 10 in a thermostatic chamber to provide zero output signal when the atmospheric temperature is changed.

In the embodiment described above, the piezoelectric elements 16 and 18 are equally divided into two. However, they may be divided at a ratio, for example, 1:2 in lateral direction thereof. In this case, it is sufficient to adjust the first differential circuit 34 in accordance with the signal ratio of the divided sections 16a and 16b of the piezoelectric elements 16 corresponding to the Coriolis force so that the signal corresponding to the Coriolis force in the output of the first differential circuit 34 becomes zero. It is also sufficient to similarly adjust the divided sections 18a and 18b of the piezoelectric element 18 and the second differential circuit 38. Therefore, the piezoelectric elements 16 and 18 may be divided in any ratio. In addition, signals of the respective divided sections 16a, 16b, 18a, and 18b of the piezoelectric element 16 and 18 may be connected to the cumulative circuit and the differential circuit through a buffer by taking impedance of the circuits into account.

FIG. 5 is a block diagram showing another embodiment of the present invention employing a vibrating gyroscope 10'. In the vibrating gyroscope 10', the divided section 16b of the piezoelectric element 16 and the divided section 18b of the piezoelectric element 18 are connected to a first differential circuit 50. In addition, the divided section 16a of the piezoelectric element 16 and the divided section 18a of the piezoelectric element 18 are connected to a second differential circuit 52. Output terminals of these two differential circuits 50 and 52 are connected to an input terminal of an arithmetic circuit 54.

In this vibrating gyroscope 10, the first differential circuit 50 outputs the difference between the output signals of the divided section 16b of the piezoelectric element 16 and the divided section 18b of the piezoelectric element 18, and the second differential circuit 52 outputs difference between the output signals of the divided section 16a and the divided section 18a. As described earlier, when the resonance characteristics of a detection mean vary, on the divided sections 16a and 16b of the piezoelectric element 16, the signals corresponding to the resonance characteristics varying at the same ratio are output. Similarly, when the resonance characteristics of the detection mean vary, on the divided sections 18a and 18b of the piezoelectric element 18, the signals corresponding to the resonance characteristics varying at the same ratio are output. Therefore, the signals corresponding to the resonance characteristics vary at the same ratio when comparing the output signal of the first differential circuit 50 with that of the second differential circuit 52. Thus, when the arithmetic circuit 54 is adjusted to make the signal corresponding to the resonance characteristics zero, it can be arranged that a signal corresponding to the resonance characteristics is not output from the arithmetic circuit 54 even if the resonance characteristics are changed due to a change in the atmospheric temperature or warpage of the vibrating body. Consequently, only a signal corresponding to the Coriolis force can be obtained from the arithmetic circuit 54.

When there is no rotation, charges generated from the respective divided sections 16b and 18b of the piezoelectric elements 16 and 18 are smaller than charges generated from the divided sections 16a and 18a, so the arithmetic circuit 54 multiplies the output signal of the second differential circuit 52 by n times (n<1), and subtracts it from the output signal of the first differential circuit 50. Accordingly, the signal corresponding to the Coriolis force output from the second differential circuit 52 is multiplied by n times and subtracted from the signal corresponding to the Corioli's force output from the first differential circuit 50. Thus, the signal corresponding to the Coriolis force is little attenuated. Therefore, even if the resonance characteristics of the two detection means are changed, the rotation angular velocity can be detected at high sensitivity.

Figure 6:
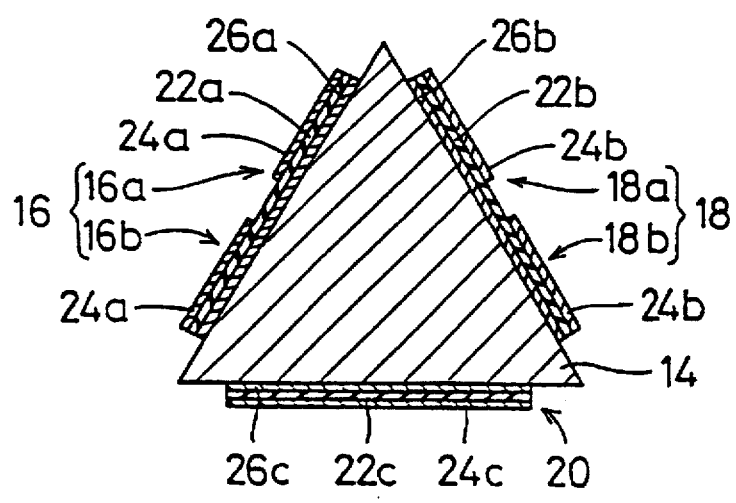
FIG. 6 is a sectional view showing another example of vibrator used in the vibrating gyroscope according to the present invention.

In each embodiment described above, the divided sections 16a and 16b of the piezoelectric elements 16 may be formed, as shown in FIG. 6, by making the piezoelectric layer 22a and the electrode 26a common, and dividing only the electrode 24a. Of course, the piezoelectric element 18 may be similarly divided. In this case, another electrode may be formed between the divided sections and grounded by an approach such as connecting it to the vibrating body 14 by taking capacitive coupling between the divided sections into account.

Figure 7:
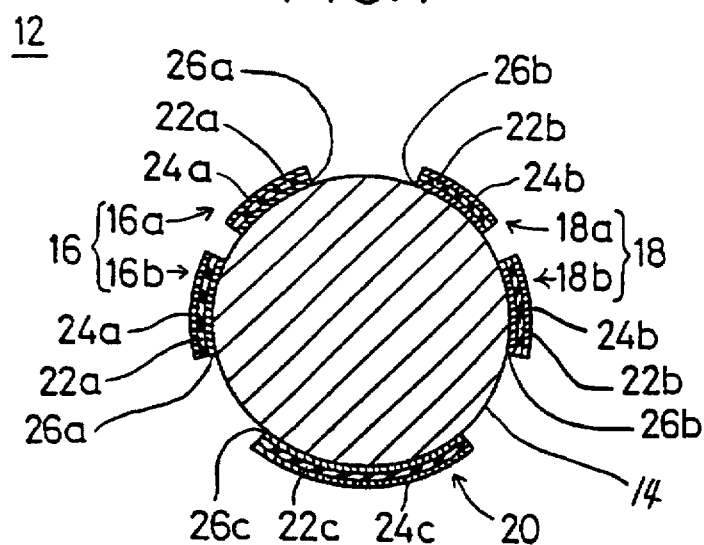
FIG. 7 is a sectional view showing still another example of the vibrator used in the vibrating gyroscope according to the present invention.
Figure 8:
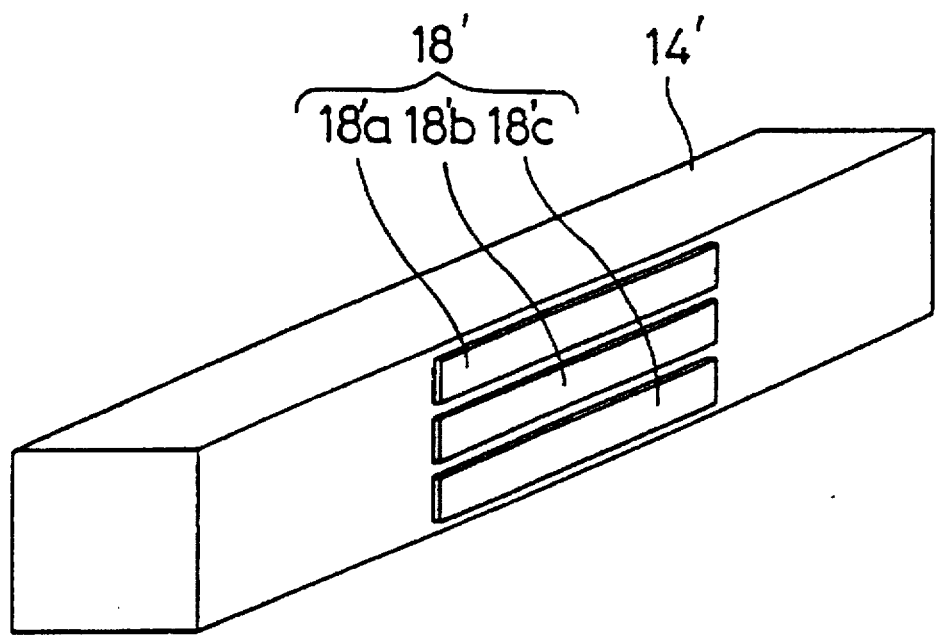
FIG. 8 is a perspective view showing yet still another example of vibrator used in the vibrating gyroscope according to the present invention.
Figure 9:
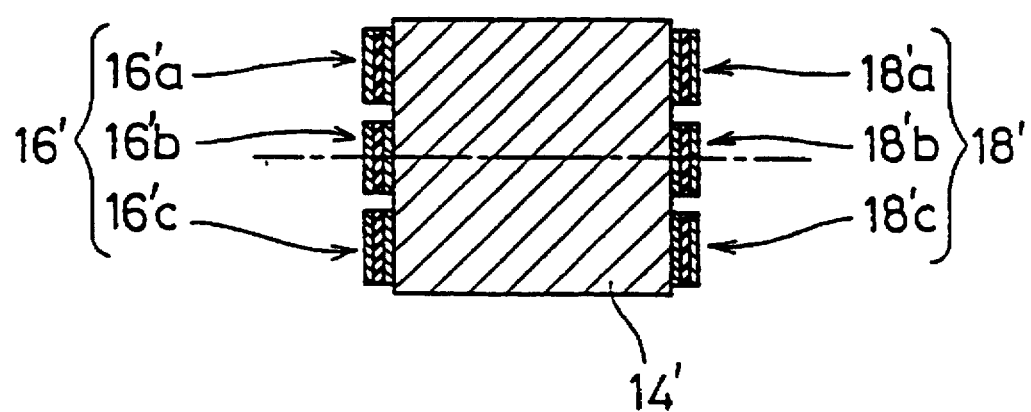
FIG. 9 is a sectional view of the vibrator shown in FIG. 8.
Figure 12:
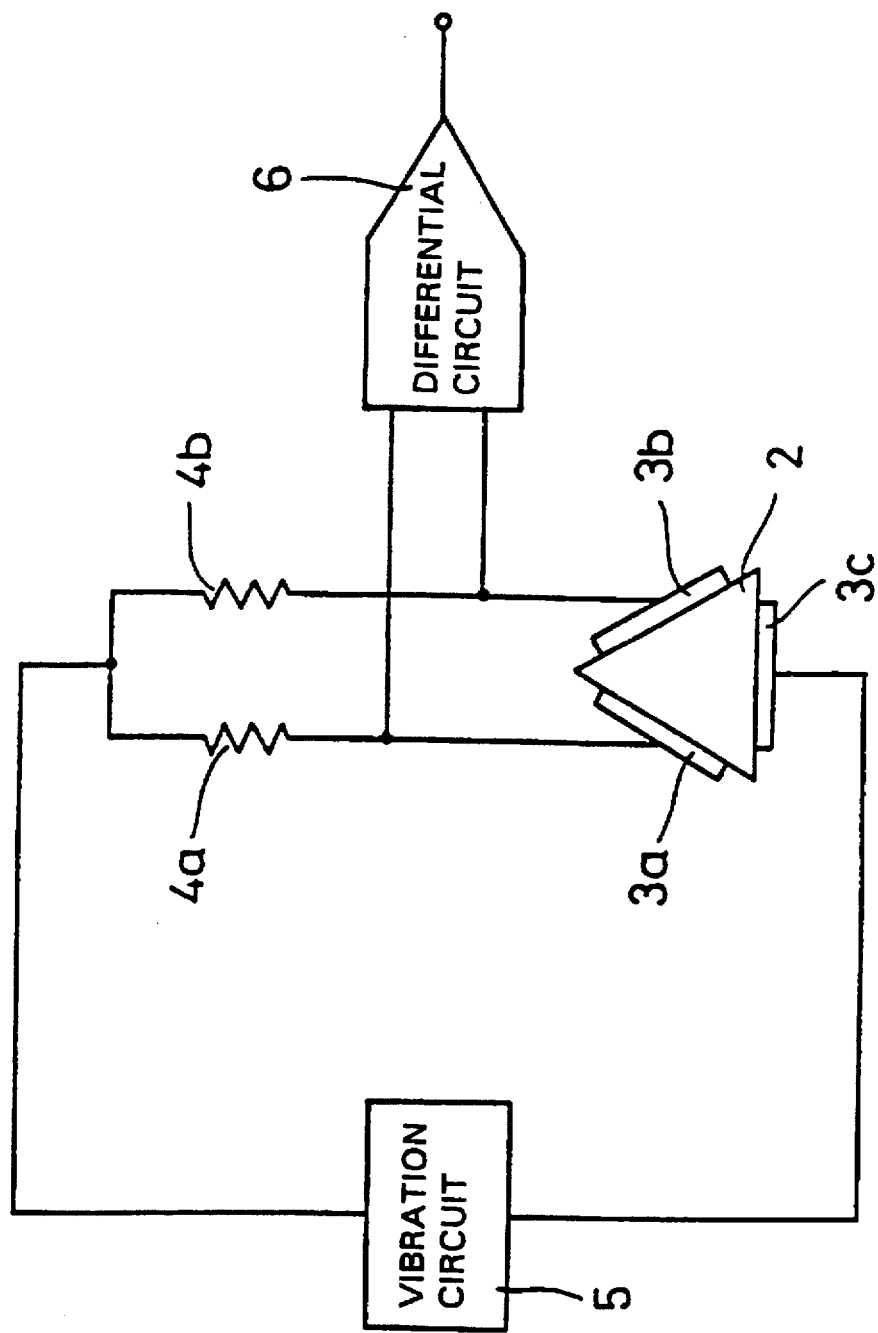
FIG. 12 is a block diagram showing an example of a conventional vibrating gyroscope.

Although, in the above embodiments, a columnar, triangular shaped member is used as the vibrating body 14 of the vibrator 12, a vibrating body 14 in the form of a cylinder, as shown in FIG. 7 may be used, or a square-shaped body, as shown in FIGS. 8 and 9, or any other suitable shape, not shown.

In addition, similar to the vibrator shown in FIG. 6, the piezoelectric layer and the electrode bonded to the vibrating body may be made common, and only the electrodes on the surface is divided into three.

Furthermore, as a driving method, the output signal of the piezoelectric element 20 may be used as a feedback signal to input driving signals into the piezoelectric elements 16 and 18. Alternatively, output signals from the divided section 16b of the piezoelectric element 16 and the divided section 18b of the piezoelectric element 18 may be used as feedback signals to input driving signals into the divided sections 16a and 18a. Thus, the driving method is not limited to one specific approach, but various driving method may be employed.

Turning now to FIGS. 8 and 9, the use of a vibrating body 14' in the form of a square pole will now be described. The components which are the same as those in the first embodiment of FIGS. 1–4 and FIG. 5 are designated by the same reference numeral; components which are different but perform similar functions are designated by primed or double primed reference numerals. In this vibrator 12', the piezoelectric elements 16' and 18' are formed on opposite faces of the vibrating body 14'. Then, the piezoelectric element 16' is divided into three sections 16'a, 16'b, and 16'c. These divided sections 16'a, 16'b, and 16'c are equally divided. Consequently, the divided section 16'b is formed on a dash-and-dot line passing the center axis of the vibrating body 14'. Similarly, the piezoelectric element 18 is divided into three sections 18'a, 18'b, and 18'c. These divided sections 18'a, 18'b, and 18'c are equally divided. Consequently, the divided section 18'b is formed on a dash-and-dot line passing the center axis of the vibrating body 14'.

When such a vibrator 12 is used, for example, as shown in FIG. 10, the divided sections 16'c and 18'c of the piezoelectric elements 16' and 18' are connected to resistors 60 and 62, respectively. Then, a vibration circuit 30 is connected between the divided sections 16a and 18a of the piezoelectric elements 16 and 18, and the resistors 60 and 62. In this vibrating gyroscope 10", the divided sections 16'a and 18'a are used as drivers for bending and oscillating the vibrating body 14', and the divided sections 16'c and 18'c are used for feedback. Thus, the vibrating body 14' is bent and vibrated in a direction parallel to planes which the piezoelectric elements 16' and 18' are respectively provided by a signal from the vibration circuit 30.

In addition, the divided sections 16'b and 16'c of the piezoelectric element 16', and the divided sections 18'b and 18'c of the piezoelectric element 18' are used for detection. Accordingly, when this vibrator 12 is used, similar to the embodiment shown in FIG. 1, the divided sections 16'b and 16'c of the piezoelectric element 16' are connected to a first cumulative circuit 32 and a first differential circuit 34. Also, the divided sections 18b and 18c of the piezoelectric element 18 are connected to a second cumulative circuit 36 and a second differential circuit 38. Even in such vibrating gyroscope 10", similar to the embodiment shown in FIG. 1, a signal not containing a signal component corresponding to the resonance characteristics of each detection mean, but containing only a signal component corresponding to the Corioli's force can be obtained.

When such a vibrator 12' is used, as shown in FIG. 8, since the divided sections 16'b and 18'b of the piezoelectric elements 16' and 18' are formed on the dash-and-dot line passing the center axis of the vibrating body 14', they are formed on the center line of the bending vibration of the vibrating body at no rotation. Then, at no rotation, the divided sections 16'b and 18'b have the same area for the expanding portion and the contracting portion to cancel the generated charges with opposite polarities so that the output becomes zero. Thus, the output signal of the first cumulative circuit 32 becomes same as that of the first differential circuit 34 so that it is possible to make zero the output of the third differential circuit 40. Similarly, the output signal of the second cumulative circuit 36 becomes same as that of the second differential circuit 38 so that it is possible to make zero the output of the fourth differential circuit 42. Thus, at no rotation, the output of the arithmetic circuit 44 can be made zero so that offset can be adjusted.

It is a matter of course that the vibrator 12' may be used in the circuit shown in FIG. 5. In such case, the divided sections 16b and 18b of the piezoelectric elements 16 and 18 are connected to the first differential circuit 50, and the divided sections 16'c and 18'c of the piezoelectric elements 16' and 18' are connected to the second differential circuit 52. Even in such a vibrating gyroscope 10", similar to the embodiment shown in FIG. 5, it is possible to obtain a signal not containing a signal component corresponding to the resonance characteristics of each detection mean, but containing only a signal component corresponding to the Coriolis force.

In the case of the vibrator 12' using a square columnar vibrating body 14', the divided sections 16a and 16b of the piezoelectric element 16 and the divided sections 18a and 18b of the piezoelectric element 18 may be used for detection. That is, when the divided sections 16b and 18b at the center are used for one detection mean, it is possible to make zero the output of the arithmetic circuit at no rotation.

When it is intended to use a resonance type to enhance the sensitivity, an approach such as grinding of the faces on which the piezoelectric elements 16 and 18 are not formed may be employed. In addition, similar to the vibrator shown in FIG. 6, the piezoelectric layer and the electrode bonded to the vibrating body may be made common, and only the electrode on the surface divided into three. In this case, the number of the piezoelectric ceramics used as the piezoelectric layer can be two, which also facilitates bonding to the vibrating body. Additionally, the piezoelectric ceramics may be used as the material of the vibrating body and the divided electrodes formed on its opposite surfaces. A bimorph structure may be also employed. When the square pole vibrating body 14' is used, the piezoelectric elements 16' and 18' may not be necessarily divided into three. For example, the divided sections 16'c and 18'c for one end may be omitted. In this case, the divided sections 16'a and 18'a are used for driving, while the divided sections 16a and 16b, as well as 18a and 18c are used for detection.

Figure 11:
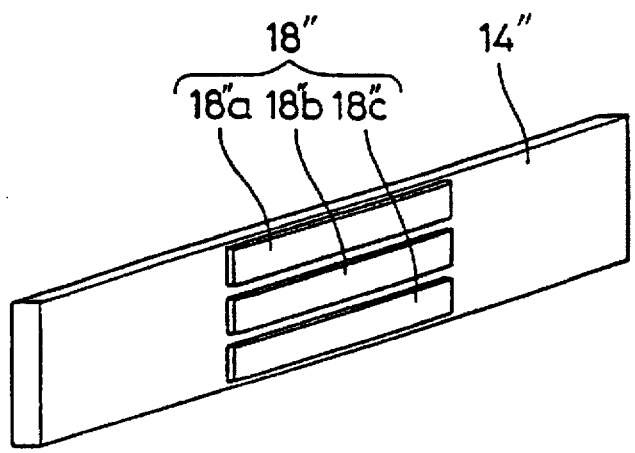
FIG. 11 is a perspective view showing yet another example of vibrator used in the vibrating gyroscope according to the present invention.

Furthermore, as shown in FIG. 11, the vibrating body may have a rectangular shape 14". In this case, piezoelectric elements divided into three are formed on each main surface of the vibrating body 14". When such vibrating body 14" is used, a support portion which is formed near a node of bending vibration of the vibrating body 14" may be integrally formed with the vibrating body. This improves the productivity of the vibrating body, and attains cost saving.

As described above, the vibrating body may be of triangular, square, cylindrical, rectangular or other columnar shape. In addition, the present invention may be applied not only to a piezoelectric type, but also to an electrostatically driven vibrating gyroscope. When the present invention is applied to an vibrating gyroscope having a plurality of detection means, the rotation angular velocity can be accurately detected regardless of variation in the resonance characteristics of these detection means.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vibrating gyroscope, comprising:

a vibrating body for vibration;

a plurality of detection means respectively provided at spaced locations of said vibrating body, each of said detection means being divided into several sections;

a first cumulative circuit having input terminals to which two of the divided sections of one of said detection means are respectively connected;

a first differential circuit having input terminals to which said two of the divided sections of said one of said detection means are respectively connected;

a second cumulative circuit having input terminals to which two of the divided sections of another one of said detection means are respectively connected;

a second differential circuit having input terminals to which said two of the divided sections of said another one of said detection means are respectively connected;

a third differential circuit having input terminals to which said first and second cumulative circuits are respectively connected;

a fourth differential circuit having input terminals to which said first and second differential circuits are respectively connected; and an arithmetic circuit having input terminals to which said third and fourth differential circuits are respectively connected.

2. A vibrating gyroscope as claimed in claim 1, wherein said plurality of detection means are disposed to be symmetrical to a vibration direction of said vibrating body at no rotation.

3. A vibrating gyroscope as claimed in claim 1, wherein one of the divided sections of each of said detection means is provided on the center line of vibration of said vibrating body at no rotation.

4. A vibrating gyroscope as claimed in claim 1, wherein said vibrating body is in the form of a triangular column and said plurality of detection means comprise piezoelectric elements provided on two sides of said vibrating body, each of said piezoelectric elements being divided into two along a center axis of said vibrating body.

5. A vibrating gyroscope as claimed in claim 1, wherein said vibrating body is in the form of a square column and said plurality of detection means comprise piezoelectric elements provided on two opposite sides of said vibrating body, each of said piezoelectric elements being divided into three along a center axis of said vibrating body.

6. A vibrating gyroscope as claimed in claim 1, wherein said vibrating body is cylindrical and said plurality of detection means comprise piezoelectric elements provided on opposite sides of said vibrating body, each of said piezoelectric elements being divided.

7. A vibrating gyroscope, comprising:

a vibrating body for vibration;

a plurality of detection means respectively provided at spaced locations of said vibrating body, each of said detection means being divided into several sections with a spacing between the sections of each of said detection means being smaller than a spacing between the sections of one of said detection means and the sections of another of said detection means;

a first differential circuit having first and second input terminals, one of the divided sections of one of said detection means being connected to said first input terminal and one of the divided sections of another of said detection means being connected to said second input terminal;

a second differential circuit having first and second input terminals, another one of the divided sections of said one of said detection means being connected to said first input terminal of said second differential circuit and another one of the divided sections of said another of said detection means being connected to said second input terminal of said second differential circuit; and an arithmetic circuit having input terminals to which said first and second differential circuits are respectively connected.

8. A vibrating gyroscope as claimed in claim 7, wherein said plurality of detection means are disposed to be symmetrical to a vibration direction of said vibrating body at no rotation.

9. A vibrating gyroscope as claimed in claim 8, wherein one of the divided sections of each of said detection means is provided on the center line of vibration of said vibrating body at no rotation.

10. A vibrating gyroscope as claimed in claim 7, wherein said vibrating body is in the form of a triangular column and said plurality of detection means comprise piezoelectric elements provided on two sides of said vibrating body, each of said piezoelectric elements being divided into two along a center axis of said vibrating body.

11. A vibrating gyroscope as claimed in claim 7, wherein said vibrating body is in the form of a square column and said plurality of detection means comprise piezoelectric elements provided on two opposite sides of said vibrating body, each of said piezoelectric elements being divided into three along a center axis of said vibrating body.

12. A vibrating gyroscope as claimed in claim 7, wherein said vibrating body is cylindrical and said plurality of detection means comprise piezoelectric elements provided on opposite sides of said vibrating body, each of said piezoelectric elements being divided.

13. A vibrating gyroscope, comprising:

a vibrating body for vibration;

a plurality of detection means respectively provided at spaced locations of said vibrating body, each of said detection means being divided into several sections with each section of each of said detection means being positioned on said vibrating body to generate different electrical signals at no rotation and with each section of one of said detection means having a corresponding section in another of said detection means, the corresponding sections being positioned on said vibrating body to theoretically generate the same electrical signals at no rotation and with a spacing between the sections of each of said detection means being smaller than a spacing between the sections of one of said detection means and the sections of another of said detection means; and means for interconnecting the sections of said plurality of detection means such that upon rotation of said vibrating body any differences in the electrical signals from the sections of one of the detection means and the actual electrical signals from the sections of another of said detection means are suppressed.

14. A vibrating gyroscope, comprising:

a vibrating body for vibration;

a plurality of detection elements respectively provided at spaced locations of said vibrating body, each of said detection elements being divided into several sections;

a first cumulative circuit having input terminals to which two of the divided sections of one of said detection elements are respectively connected;

a first differential circuit having input terminals to which said two of the divided sections of said one of said detection elements are respectively connected;

a second cumulative circuit having input terminals to which two of the divided sections of another one of said detection elements are respectively connected;

a second differential circuit having input terminals to which said two of the divided sections of said another one of said detection elements are respectively connected;

a third differential circuit having input terminals to which said first and second cumulative circuits are respectively connected;

a fourth differential circuit having input terminals to which said first and second differential circuits are respectively connected; and an arithmetic circuit having input terminals to which said third and fourth differential circuits are respectively connected.

15. A vibrating gyroscope as claimed in claim 14, wherein said plurality of detection elements are disposed to be symmetrical to a vibration direction of said vibrating body at no rotation.

16. A vibrating gyroscope as claimed in claim 14, wherein one of the divided sections of each of said detection elements is provided on the center line of vibration of said vibrating body at no rotation.

17. A vibrating gyroscope as claimed in claim 14, wherein said vibrating body is in the form of a triangular column and said plurality of detection elements comprise piezoelectric elements provided on two sides of said vibrating body, each of said piezoelectric elements being divided into two along a center axis of said vibrating body.

18. A vibrating gyroscope as claimed in claim 14, wherein said vibrating body is in the form of a square column and said plurality of detection elements comprise piezoelectric elements provided on two opposite sides of said vibrating body, each of said piezoelectric elements being divided into three along a center axis of said vibrating body.

19. A vibrating gyroscope as claimed in claim 14, wherein said vibrating body is cylindrical and said plurality of detection elements comprise piezoelectric elements provided on opposite sides of said vibrating body, each of said piezoelectric elements being divided.

20. A vibrating gyroscope, comprising:

a vibrating body for vibration;

a plurality of detection elements respectively provided at spaced locations of said vibrating body, each of said detection elements being divided into several sections with a spacing between the sections of each of said detection elements being smaller than a spacing between the sections of one of said detection elements and the sections of another of said detection elements;

a first differential circuit having first and second input terminals, one of the divided sections of one of said detection elements being connected to said first input terminal and one of the divided sections of another of said detection elements being connected to said second input terminal;

a second differential circuit having first and second input terminals, another one of the divided sections of said one of said detection elements being connected to said first input terminal of said second differential circuit and another one of the divided sections of said another of said detection elements being connected to said second input terminal of said second differential circuit; and an arithmetic circuit having input terminals to which said first and second differential circuits are respectively connected.

21. A vibrating gyroscope as claimed in claim 20, wherein said plurality of detection elements are disposed to be symmetrical to a vibration direction of said vibrating body at no rotation.

22. A vibrating gyroscope as claimed in claim 20, wherein one of the divided sections of each of said detection elements is provided on the center line of vibration of said vibrating body at no rotation.

23. A vibrating gyroscope as claimed in claim 20, wherein said vibrating body is in the form of a triangular column and said plurality of detection elements comprise piezoelectric elements provided on two sides of said vibrating body, each of said piezoelectric elements being divided into two along a center axis of said vibrating body.

24. A vibrating gyroscope as claimed in claim 20, wherein said vibrating body is in the form of a square column and said plurality of detection elements comprise piezoelectric elements provided on two opposite sides of said vibrating body, each of said piezoelectric elements being divided into three along a center axis of said vibrating body.

25. A vibrating gyroscope as claimed in claim 20, wherein said vibrating body is cylindrical and said plurality of detection elements comprise piezoelectric elements provided on opposite sides of said vibrating body, each of said piezoelectric elements being divided.

26. A vibrating gyroscope, comprising:

a vibrating body for vibration;

a plurality of detection elements respectively provided at spaced locations of said vibrating body, each of said detection elements being divided into several sections with each section of each of said detection elements being positioned on said vibrating body to generate different electrical signals at no rotation and with each of said section of one detection elements having a corresponding section in another detection elements, the corresponding sections being positioned on said vibrating body to theoretically generate the same electrical signals at no rotation and with a spacing between the sections of each detection elements being smaller than the spacing between the sections of one detection element and the sections of another of said detection elements; and a circuit for interconnecting the sections of said plurality of detection elements such that upon rotation of said vibrating body any differences in the electrical signals from the sections of one of the detection elements and the electrical signals from the sections of another of said detection elements are suppressed.

\* \* \* \* \*